United States Patent [19]

Jansons

[11] Patent Number: 4,767,837
[45] Date of Patent: Aug. 30, 1988

[54] METHOD FOR PREPARING POLY(ARYL ETHER KETONES)

[75] Inventor: Viktors Jansons, Los Gatos, Calif.

[73] Assignee: Raychem Corporation, Menlo Park, Calif.

[21] Appl. No.: 823,715

[22] Filed: Jan. 29, 1986

[51] Int. Cl.⁴ ........................ C08G 8/02; C08G 14/00
[52] U.S. Cl. .................................... 528/125; 528/126; 528/128; 528/219
[58] Field of Search ................ 528/125, 126, 128, 219

[56] References Cited

U.S. PATENT DOCUMENTS 4,320,224  3/1982  Rose et al. .......................... 528/125

Primary Examiner—John Kight
Assistant Examiner—M. L. Moore
Attorney, Agent, or Firm—Yuan Chao; Herbert G. Burkard

[57] ABSTRACT

A method for preparing poly(aryl ether ketones) having the repeat unit of the formula —CO—Ar—CO—Ar'— wherein Ar and Ar' are aromatic moieties at least one of which contains a diaryl ether linkage forming part of the polymer backbone, wherein Ar and Ar' are covalently linked to the carbonyl groups through aromatic carbon atoms, and wherein Ar and Ar' are independently selected from substituted and unsubstituted phenylene and substituted and unsubstituted polynuclear aromatic moieties, which method comprises heating an appropriate monomer system, for example, the potassium salt of 4-fluoro-4'-hydroxybenzophenone, in the presence of a solvent comprising an aromatic ketone of the formula

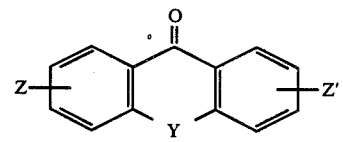

where Y is a direct bond; two hydrogen atoms, one bonded to each aromatic ring; carbonyl; oxygen; sulfur; sulfoxide; or sulfone; and wherein Z and Z' are independently hydrogen, phenyl, phenoxy, or substituted phenyl or phenoxy, with the proviso that if Z and Z' are both hydrogen, then Y is other than two hydrogen atoms.

12 Claims, No Drawings

METHOD FOR PREPARING POLY(ARYL ETHER KETONES)

BACKGROUND OF THE INVENTION

This invention relates to the preparation of poly(aryl ether ketones). The term poly(aryl ether ketone) refers to polymers having the repeat unit of the formula —CO—Ar—CO—Ar'— where Ar and Ar' are aromatic moieties at least one of which contains a diaryl ether linkage forming part of the polymer backbone and wherein Ar and Ar' are covalently linked to the carbonyl groups through aromatic carbon atoms.

Preferably, Ar and Ar' are independently selected from substituted and unsubstituted phenylene and substituted and unsubstituted polynuclear aromatic moieties. The term "polynuclear aromatic moieties" is used to mean aromatic moieties containing at least two aromatic rings. The rings can be fused, joined by a direct bond or by a linking group. Such linking groups include for example, carbonyl, ether, sulfone, sulfide, amide, imide, phenoxy, azo, alkylene, perfluoroalkylene, and the like. As mentioned above, at least one of the Ar and Ar' contains a diaryl ether linkage.

The phenylene and polynuclear aromatic moieties can contain substituents on the aromatic rings. These substituents should not inhibit or otherwise interfere with the polymerization reaction to any significant extent. Such substituents include, for example, phenyl, cyano, alkyl, 2-alkynyl, and the like.

Poly(aryl ether ketones) having the following repeat units (the simplest repeat unit being designated for a given polymer) are preferred:

—Ph—O—Ph—CO—

—Ph—O—Ph—CO—Ph—CO—

—Ph—O—Ph—O—Ph—CO—

—Ph—O—Ph—O—Ph—CO—Ph—CO—

—Ph—O—Ph—CO—Ph—O—Ph—CO—
PH—CO—

—Ph—O—Ph—O—Ph—CO—Ph—O—Ph—CO— where Ph denotes p-phenylene.

Poly(aryl ether ketones) possess many desirable properties, among which are their high temperature stability, their mechanical strength, and their resistance towards common solvents. In general, polymers in which the valence positions of the aromatic rings in the repeat unit are para with respect to each other are preferred. Such polymers have greater chemical, thermooxidative, and solvent resistance than those in which the valence positions are meta or ortho.

Poly(aryl ether ketones) generally can be prepared by either one of two methods: (1) electrophilic synthesis, in which an aryl ketone linkage is formed during the polymerization step, or (2) nucleophilic synthesis, in which an aryl ether linkage is formed during the polymerization step.

In the polymerization step of an electrophilic synthesis a carboxylic acid derivative, usually an acid halide, reacts with a phenoxy group to form a diaryl ketone. Electrophilic syntheses suffer from certain disadvantages, among which are the requirement for hydrolytically labile acid halide monomers and, in some but not all procedural variants, the use of corrosive media such as hydrogen fluoride. See, for example, U.S. Pat. Nos. 3,441,538 to Bonner, 3,441,538 to Marks and 3,953,400 to Dahl.

In the polymerization step of a nucleophilic synthesis a phenoxide salt reacts with an aryl halide to form a diaryl ether. The halide thus displaced must be activated towards nucleophilic displacement by an electron withdrawing substituent ortho or para to it. The present invention concerns nucleophilic synthesis.

A recurring limitation in nucleophilic syntheses of poly(aryl ether ketones) is the paucity of suitable solvents for the polymerization. The solvent should have sufficient solvent power to keep the growing polymer chain in solution, preventing its premature precipitation before the attainment of high molecular weights. It should be high boiling, enabling polymerization to occur at the higher temperatures at which the reaction proceeds faster and the solubility of the polymer is greater. Naturally, the solvent should be inert under the reaction conditions.

Solvents disclosed in the prior art have generally been drawn from the group broadly designated as dipolar aprotic solvents. See, for example, U.S. Pat. No. 3,764,583 to Newton et al. Among these, the ones most commonly employed have been the sulfones and sulfoxides, in particular the diaryl sulfones. See, for example, U.S. Pat. No. 4,108,837, to Johnson et al., and U.S. Pat. No. 4,320,224 to Rose et al. The number of sulfones or sulfoxides that have actually been used is quite limited, consisting primarily of dimethyl sulfoxide, dimethyl sulfone, tetramethylene sulfone (sulfolane), diphenyl sulfoxide, and diphenyl sulfone. The alkyl sulfones and sulfoxides have the drawbacks of possessing acidic alpha-hydrogens and boiling at relatively low temperatures, while their aromatic counterparts are not readily available and are often expensive. Therefore, it is desirable to develop alternative synthetic methods for poly(aryl ether ketones) and, particularly where a nucleophilic synthesis is contemplated, alternative solvent systems.

SUMMARY OF THE INVENTION

This invention provides a method for preparing poly(aryl ether ketones) having the repeat unit of the formula —CO—Ar—CO—Ar'— by a nucleophilic route. It comprises heating an appropriate monomer system in the presence of a solvent comprising an aromatic ketone of the formula

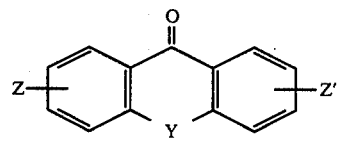

where Y is a direct bond; two hydrogen atoms, one bonded to each aromatic ring; carbonyl; oxygen; sulfur; sulfoxide; or sulfone; and wherein Z and Z' are independently hydrogen, phenyl, phenoxy, or substituted phenyl or phenoxy, with the proviso that if Z and Z' are both hydrogen, then Y is other than two hydrogen atoms. Xanthone, anthraquinone, and thioxanthen-9-one-10,10-dioxide are especially preferred.

Suitable monomer systems are selected from the group consisting of (1) at least one alkali metal salt of a halogenated aromatic ketophenol containing one halogen bonded to an aromatic carbon and activated by an electron withdrawing group situated orto or para, (2) substantially stoichiometric amounts of at least one alkali metal bis-salt of a dihydric phenol and at least one aromatic dihalide in which each halogen is bonded to an aromatic carbon and is activated by an electron withdrawing group situated ortho or para, provided that at least one from among the bis-salt and dihalide compounds contains a diaryl ketone group, and (3) combinations of the above.

An example of the first monomer system is the potassium salt of 4-fluoro-4'-hydroxybenzophenone and of the second system, substantially stoichiometric amounts of the dipotassium salt of 4,4'-dihydroxybenzophenone and 4,4'-difluorobenzophenone.

DETAILED DESCRIPTION OF THE INVENTION

Hitherto aromatic ketones have not been used as solvents for the nucleophilic synthesis of poly(aryl ether ketones). In investigating the nucleophilic synthesis of a related family of polymers, the poly(aryl ether sulfones), Johnson et al. (*J. Polym. Sci.* Part A-1 5, 2375 (1967)) tested benzophenone with poor results, reporting that it was "quite ineffective" and apparently failing to obtain polymer of reduced viscosity greater than 0.1. Since poly(aryl ether sulfones) are less cystalline than poly(aryl ether ketones) and generally more soluble in the reaction medium, their synthesis imposes less strenuous demands on the solvent. (To illustrate, Rose et al. (U.S. Pat. No. 4,320,224) report that sulfolane is a suitable solvent for the polymerization of hydroquinone with dichlorodiphenylsulfone, but not for the polymerization of hydroquinone with a dihalobenzophenone.) In view of the ineffectiveness of benzophenone as a solvent for poly(aryl ether sulfone) synthesis, it would be expected that it and other aromatic ketones will be equally ineffective for poly(aryl ether ketone) synthesis.

Contrary to this teaching, we have most unexpectedly discovered a class or aromatic ketones which are good solvents for the nucleophilic synthesis of poly(aryl ether ketones). This class is represented by the formula

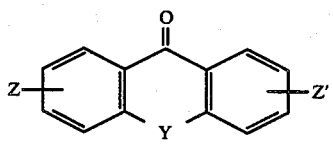

where Y is a direct bond, two hydrogens (one bonded to each aromatic ring), carbonyl, oxygen, sulfur, sulfoxide, or sulfone, and wherein Z and Z' are independently hydrogen, phenyl, phenoxy, or substituted phenyl or phenoxy, with the proviso that if Z and Z' are both hydrogen, then Y is not two hydrogens.

These ketone solvents are high boiling, possess good solvent properties, and are inert under the polymerization conditions. Poly(aryl ether ketones) prepared by procedures employing them have high molecular weights, are light in color, and readily dissolve in concentrated sulfuric acid to form light colored solutions, indicating efficent polymerization with a minimum of branch- or chromophore-forming side reactions.

Specific examples of these ketone solvents include, by way of illustration and not of limitation, xanthone (9-xanthenone), anthraquinone, fluorenone, thioxanthen-9-one (thioxanthone), thioxanthen-9-one-10-oxide, thioxanthen-9-one-10,10-dioxide, 3-phenylxanthone, 3-phenoxyxanthone, 2-phenoxyxanthone, 3-phenoxyfluorenone, 2-phenoxyfluorenone, 1-phenoxyanthraquinone, 2-phenoxyanthraquinone, 4-phenoxybenzophenone, 4,4'-diphenoxybenzophenone, 4,4'-dibenzoylbiphenyl, 4,4'-diphenylbenzophenone, and 4-phenylbenzophenone. Xanthone, anthraquinone, and thioxanthen-9-one-10,10-dioxide are especially preferred.

The phenoxide salts used in the instant invention can be prepared in situ by the addition of a substantially stoichiometric amount of an alkali metal base, for example, sodium hydroxide, sodium carbonate, potassium hydroxide, potassium carbonate, or tribasic potassium phosphate. Potassium carbonate and tribasic potassium phosphate are especially preferred. Where the base is addedas an aqueous solution or is hydrated, the water can be removed by azeotroping prior to the initiation of polymerization. Chlorobenzene, benzene, and xylene are commonly used azeotroping agents. Alternatively, the salt can be prepared and isolated ahead of time, for example, by admixing stoichiometric amounts of the phenolic compound and aqueous potassium hydroxide and then removing the water. While this procedure is more laborious, it offers the advantages of more facile handling and better stoichiometric control and, where an especially pure salt is desired, the possibility of purification prior to polymerization. The two techniques can be combined, for example by admixing an isolated salt with a phenol and an amount of base substantially equivalent to that of the phenol.

The halide displaced by the phenoxide group must be bonded to an aromatic carbon atom and must be activated by an electron withdrawing group ortho or para to it. Ketone and sulfone groups are particularly desirable as activating groups because they are strongly electron withdrawing, are inert under the polymerization conditions, and are divalent and therefore capable of forming part of the polymer backbone. Aromatic halides suitable for the practice of this invention include the fluorides, cholorides, bromides, and iodides. The fluorides and chlorides are particularly preferred, the former for their reactivity and the latter for their lower cost.

Specific monomer systems are of two general types. The first, hereinafter designated AB, consists of the alkali metal salt of a halophenol. It is capable of being polymerized without the addition of another monomer. The following list of halophenols is illustrative but not exhaustive: 4-fluoro-4'-hydroxybenzophenone, 4-chloro-4'-hydroxybenzophenone, 1-(4-fluorobenzoyl)-4-(hydroxybenzoyl)-benzene, 1-(4-chlorobenzoyl)-4-(hydroxybenzoyl)benzene, 4-(fluorobenzoyl)-4'-hydroxydiphenyl ether, 4-(chloro-benzoyl)-4'-hydroxydiphenyl ether, 4-(fluorobenzoyl)-4'-(hydroxybenzoyl)diphenyl ether, 4-(chlorobenzoyl)-4'-(hydroxybenzoyl)diphenyl ether, 4-(fluorobenzoyl)-4'-hydroxybiphenyl, 4-(chlorobenzoyl)-4'-hydroxybiphenyl, 4-(fluorobenzoyl)-4'-(hydroxybenzoyl)biphenyl, and 4-(chlorobenzoyl)-4'-(hydroxybenzoyl)biphenyl.

A noteworthy advantage of the present invention is that AB monomers polymerize well in the ketone solvents while in other solvents they are known to undergo undesirable side reactions. Thus, Attwood et al. (*Polymer* 22, 1096 (1981)) report that the polymerization of the potassium salt of 4-fluoro-4'-hydroxybenzophenone in diphenyl sulfone yields gelled polymer that forms intensely red solutions in sulfuric acid. In contrast, when polymerized by the method of the present invention, the same monomer yields polymer that is free of gel and forms pale yellow solutions in sulfuric acid.

The second system, hereinafter designated AA/BB, consists of substantially stoichiometric amounts of an alkali metal bis-salt of a bisphenol AA and an aryl dihalide BB. The following list of bisphenols AA is illustrative but not exhaustive: hydroquinone, 4,4'-dihydroxybenzophenone, 4,4'-diphenol, bis-(4-hydroxyphenyl)-sulfone, bis-(4-hydroxyphenyl)ether, 2,6-dihydroxyanthraquinone, 2,2-bis-(4-hydroxyphenyl)propane, 4-hydroxy-4'-(4-hydroxyphenyl)-diphenyl ether, and 2,2-bis-(4-hydroxyphenyl)-1,1,1,3,3,3-hexafluoropropane.

The following list of aryl dihalides BB is illustrative but not exhaustive: 4,4'-difluorobenzophenone, 4,4'-bis-(4-fluorobenzoyl)diphenyl ether, 1,4-bis-(4-fluorobenzoyl)benzene, 4,4'-bis-(4-fluorobenzoyl)biphenyl, bis-(4-fluorophenyl)sulfone, 2,6-difluoroanthraquinone, and the corresponding chloro analogs.

Combinations of monomer systems are possible. For example, two different halophenols AB and A'B' can be copolymerized. Or a bisphenol AA can be polymerized with a mixture of dihalides BB and B'B', or vice versa. Or even a halophenol AB can be copolymerized with a mixture of a bisphenol AA and a dihalide BB, provided AA and BB are present in substantially stoichiometric amounts.

Poly(aryl ether ketones) prepared according to this invention can contain functional groups other than ether or ketone. Sulfone is a particularly desirable additional functional group because it can lower the cystalline melting point of the polymer, thereby facilitating melt processing, without sacrificing thermooxidative or hydrolytic stability. Monomers suitable for the introduction of sulfone groups can be AB (for example, 4-fluoro-4'-hydroxydiphenylsulfone), AA (for example, 4,4'-dihydroxydiphenylsulfone), or BB (for example, 4,4'-dichlorodiphenylsulfone).

Polymerization mixtures according to this invention should contain about 20 to about 200 weight per cent, preferably about 30 to about 100 weight per cent, of the ketone solvent based on the weight of the total polymerization mixture. The mixture is heated, preferably under an inert atmosphere, at a temperature between about 200° and about 400° C., preferably between about 250° and about 380° C., and most preferably between about 325° and about 365° C., until polymerization is complete. Where desirable, the heating can be accomplished in stages, for example initially at a lower temperature and then at higher temperatures. Where the phenolic salt is prepared from a carbonate base, stagewise heating with a pause at about 220° C. is recommended because of the frothing due to the evolution of carbon dioxide gas.

The time of polymerization is dependent on the reactivity of the monomer system, the temperature of polymerization, the scale of the reaction, the target molecular weight, and other such variables and should therefore be determined on a case by case basis. For monomers where the displaced halogen is fluoride, heating for 10 to 20 min at about 350° C. is normally sufficient. Of course, once polymerization to the target molecular weight has occurred, it is undesirable to continue heating.

As mentioned above, one of the important features of this invention is that poly(aryl ether ketones) of high molecular weight are obtained. By "high molecular weight" is meant polymer having an inherent viscosity greater than 0.6. Preferably the polymer prepared by the process of this invention has an inherent viscosity in the range of about 0.6 to 2.0. Polymers having an inherent viscosity below about 0.6 are generally not useful because they have poor mechanical properties, such as tensile strength and elongation. They also tend to be brittle while polymers having an inherent viscosity above about 2.0 are very difficult to melt process. Throughout this application, inherent viscosity refers to the mean inherent viscosity determined according to the method of Sorenson et al., "Preparative Methods of Polymer Chemistry," 2nd Ed., Interscience (1968), at page 44 (0.1 g polymer dissolved in 100 mL of concentrated sulfuric acid at 25° C.).

If desired, the molecular weight of the polymer can be controlled by various methods, either singly or in combination. The simplest one is to employ a slight stoichiometric imbalance of monomers when polymerizing an AA/BB system. For AB monomers, which are intrinsically stoichiometrically balanced, an "imbalance" may be created by adding a slight amount of an AA or BB monomer, or unequal amounts of the two. Alternatively, the viscosity of the reaction medium can be monitored and the polymerization stopped when the viscosity corresponding to the desired molecular weight is attained. As another alternative, molecular weight can be controlled by adding suitable monofunctional capping agents to the monomers prior to initiation of polymerization. The monofunctional capping agent can be a phenol, such as 4-hydroxybenzophenone, or an activated aryl halide, such as 4-fluorobenzophenone. Even where a stoichiometric imbalance or viscosity monitoring is used, the addition of such capping agents may be desirable to control the chemical nature of the end groups so that the polymer chains are terminated with less reactive groups and are consequently more stable. For this latter purpose, the addition of the monofunctional capping agent may be postponed until the completion of polymerization.

The following examples illustrate the process of this invention using a variety of ketone solvents and monomer systems. It is to be understood that other reactants and reaction media within the scope of the teaching of this invention can be employed, if desired.

EXAMPLE 1

The potassium salt of 4-fluoro-4'-hydroxybenzophenone was prepared by dissolving 4-fluoro-4'-hydroxybenzophenone (25.05 g, 0.116 mole) and potassium phosphate (0.492 g, 0.0023 mole) were dissolved in 90:10 methanol-water potassium hydroxide solution (108 mL, 1.000 N) under nitrogen and with heating over a steam bath. The solvents were then removed using a rotary evaporator. The yellow solid residue was was then dried under vacuum at 120°–143° C./0.5 hr, crushed, and dried again at 135°–155° C./2.5 hr, yielding as yellow powder the potassium salt of 4-fluoro-4'-hydroxybenzophenone containing an estimated 2 mole per cent potassium phosphate (bufferring agent) and 4-fluoro-4'-hydroxybenzophenone, based on the starting stoichiometries.

The potassium salt of 4-fluoro-4'-hydroxybenzophenone (0.25 g, 0.98 mole) prepared above and xanthone (46 weight per cent) were heated under nitrogen for 5 min at 214° C., then 11 minutes at 353°-7° C., yielding a pale yellow highly viscous melt.

Upon cooling, the solidified melt was cut up into small pieces and extracted with boiling acetone (20 min), water, methanol, and methanol-water. After drying (1 hr/120° C. in vacuo), a white polymer with the repeat unit

—Ph—O—Ph—CO— was produced. Its inherent viscosity was 2.37. Its sulfuric acid solution was light yellow and remained so upon prolonged standing, indicating absence of carbonium ion forming centers. Its proton-NMR spectrum was consistent with the assigned structure.

The polymer was pressed (2 min/400° C.) into a light colored, tough, flexible slab with inherent viscosity above 2.6 (some gel).

EXAMPLE 2

The polymerization of the dipotassium salt of hydroquinone with 4,4'-bis-(4-fluorobenzoyl)benzene in anthraquinone solvent yields a polymer with the repeat unit

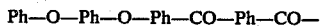

Ph—O—Ph—O—Ph—CO—Ph—CO—

EXAMPLE 3

The polymerization of the dipotassium salt of 4,4'-dihydroxybenzophenone with 4,4'-difluorobenzophenone in thioxanthen-9-one-10,10-dioxide yields a polymer with the repeat unit

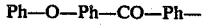

Ph—O—Ph—CO—Ph—

What is claimed is:

1. A method of preparing a poly(aryl ether ketone) having a repeat unit of the formula

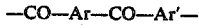

—CO—Ar—CO—Ar'— where Ar and Ar' are aromatic moieties at least one of which contains a diaryl ether linkage forming part of the polymer backbone, where Ar and Ar' are covalently linked to the carbonyl groups through aromatic carbon atoms, and where Ar and Ar' are independently selected from substituted and unsubstituted phenylene and substituted and unsubstituted polynuclear aromatic moieties, which method comprises heating a monomer system selected from the group consisting of (a) at least one alkali metal salt of a halogenated aromatic ketophenol having one halogen bonded to an aromatic carbon and activated by an electron withdrawing group situated ortho or para, (b) substantially stoichiometric amounts of at least one alkali metal bis-salt of a dihydric phenol and at least one aromatic dihalide in which each aromatic halogen is bonded to an aromatic carbon atom and is activated by an electron withdrawing group situated ortho or para, provided that at least one from among the bis-salt and dihalide compounds contains a diaryl ketone group, and (c) combinations of the above in the presence of a solvent comprising an aromatic ketone selected from the the group consisting of xanthone, fluorenone, thioxanthen-9-one, and anthraquinone

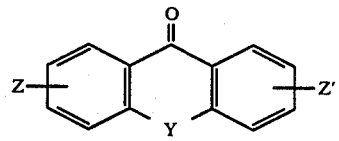

2. A method in accordance with claim 1 wherein the monomer system is selected from the group consisting of
   (a) the potassium salt of 4-fluoro-4'-hydroxybenzophenone,
   (b) substantially stoichiometric amounts of the dipotassium salt of 4,4'-dihydroxybenzophenone and 4,4'-difluorobenzophenone,
   (c) substantially stoichiometric amounts of the dipotassium salt of hydroquinone and 1,4-bis-(4-fluorobenzoyl)benzene,
   (d) substantially stoichiometric amounts of the dipotassium salt of 4,4'-dihydroxybenzophenone and 1,4-bis-(4-fluorobenzoyl)benzene, and
   (e) substantially stoichiometric amounts of the dipotassium salt of hydroquinone and 4,4'-difluorobenzophenone.

3. A method in accordance with claim 1 wherein the monomer system comprises the potassium salt of 4-fluoro-4'-hydroxybenzophenone.

4. A method in accordance with claim 1 wherein the monomer system comprises substantially stoichiometric amounts of the dipotassium salt of 4,4'-dihydroxybenzophenone and 4,4'-difluorobenzophenone.

5. A method in accordance with claim 1 wherein the monomer system comprises substantially stoichiometric amounts of the dipotassium salt of hydroquinone and 1,4-bis-(4-fluorobenzoyl)benzene.

6. A method in accordance with claim 1 wherein the monomer system comprises substantially stoichiometric amounts of the dipotassium salt of 4,4'-dihydroxybenzophenone and 1,4-bis-(4-fluorobenzoyl)benzene.

7. A method in accordance with claim 1 wherein the monomer system comprises substantially stoichiometric amounts of the dipotassium salt of hydroquinone and 4,4'-difluorobenzophenone.

8. A method in accordance with claim 1 or claim 2 wherein said aromatic ketone solvent is selected from the group consisting of xanthone, anthraquinone, and thioxanthene-9-one.

9. A method in accordance with claim 1 or claim 2 wherein said aromatic ketone solvent is xanthone.

10. A method in accordance with claim 1 or claim 2 wherein the polymerization mixture is heated at a temperature between about 325° and about 365° C.

11. A method in accordance with claim 1 or claim 2 wherein the alkali metal is potassium.

12. A method in accordance with claim 1 or claim 2 wherein said aromatic ketone solvent is present in an amount between about 30 to about 100 weight per cent of the polymerization mixture.

* * * * *